United States Patent [19]

Poiger et al.

[11] 4,194,017
[45] Mar. 18, 1980

[54] FLAVORED BOUILLON BASE

[75] Inventors: Hermann Poiger, Dübendorf; Lienhard B. Huster, Wintherthur, both of Switzerland

[73] Assignee: Societe d'Assistance Technique pour Produits Nestle S.A., Lausanne, Switzerland

[21] Appl. No.: 899,719

[22] Filed: Apr. 25, 1978

Related U.S. Application Data

[63] Continuation of Ser. No. 714,116, Aug. 13, 1976, abandoned.

[30] Foreign Application Priority Data

Aug. 26, 1975 [CH] Switzerland ............... 11033/75

[51] Int. Cl.² ...................................... A23L 1/231
[52] U.S. Cl. ................................... 426/533; 426/650; 426/476
[58] Field of Search ............. 426/60, 62, 533, 650, 426/656, 476

[56] References Cited

U.S. PATENT DOCUMENTS

| | | | |
|---|---|---|---|
| 3,716,380 | 2/1973 | de la Potterie | 426/533 |
| 3,778,513 | 12/1973 | Shiga et al. | 426/60 X |
| 3,840,674 | 10/1974 | Mosher | 426/533 |
| 3,914,450 | 10/1975 | Robbins et al. | 426/533 |
| 3,961,080 | 6/1976 | Sugimoto et al. | 426/60 |

FOREIGN PATENT DOCUMENTS 13097 of 1902 United Kingdom ............... 426/62
10937 of 1912 United Kingdom ............... 426/62

Primary Examiner—Raymond N. Jones
Assistant Examiner—Esther M. Kepplinger
Attorney, Agent, or Firm—Watson, Leavenworth, Kelton & Taggart

[57] ABSTRACT

A process for the production of a flavoring product reminiscent of meat in taste, which comprises diluting a yeast autolysate with at least the same quantity by weight of water, precipitating substantially insoluble salts, especially alkaline-earth metal phosphates, by heating the diluted autolysate at a pH-value in the range from 7 to 8.5, separating solid fractions from the autolysate treated by heating so that only a solution is left, treating the residual solution obtained by steam distillation, concentrating the treated solution by evaporation to a dry matter content of from 75% to 85% by weight, mixing the concentrate obtained with at least one vegetable protein hydrolysate, a monosaccharide and a substance containing sulphur in sulphide form, and heating the mixture for 0.5 to 5 minutes to a temperature in the range from 100° C. to 200° C. to obtain a reaction product.

7 Claims, No Drawings

FLAVORED BOUILLON BASE

This is a continuation of application Ser. No. 714,116, filed Aug. 13, 1976, now abandoned.

This invention relates to a process for the production of a flavouring product reminiscent of meat in its taste, in which a mixture containing at least one yeast protein degradation product, a monosaccharide and a substance containing sulphur in sulphide form is reacted by heating.

There are already various processes for producing substances which are capable of imparting to a food, to which they are added, a flavour reminiscent of that of meat. The production of substances such as these is virtually always based on the Maillard reaction in which at least one monosaccharide, a substance containing sulphur in sulphide form and an amino acid are used as reactants. Among the monosaccharides which have been used for this purpose, there may be mentioned pentoses, such as xylose, arabinose and ribose, and hexoses, such as galactose, mannose and glucose for example.

The sulphur compounds commonly used for this type of reaction include sulphur-containing amino acids, cystine, cysteine and methionine, or thiamine for example. So far as the amino acid sources are concerned, they are generally selected from the acid hydrolysates of vegetable proteins of all kinds, soya cake or peanut cake, wheat gluten for example, or from the autolysates of yeasts, such as brewer's yeast or baker's yeast.

It is thus known that these thoroughly mixed reactants can be heated to a temperature of 100° C. or above for a certain period until the mixture browns and gives off an aroma reminiscent of that of meat. It is known that, depending upon the exact choice of the reactants and their proportions, it is possible to obtain nuances which are reminiscent more precisely of the aroma of beef or of the aroma of chicken or pork for example. It is also known that nucleotides, such as inosine or guanosine monophosphate, or sodium glutamate for example can also be added to these mixtures in order to enhance the flavour of the end product. Some conventional processes even make use of aromatic additives, such as extracts or powders of onion, celery or garlic for example. Some known products are highly aqueous others less aqueous, whilst some are fatty and others are non-fatty, and the production processes used are obviously governed to a large extent by these considerations of dry matter content and percentage of fats. At all events, it is remarkable to find that it is very difficult, in the production of aromatic substances intended to recall the flavour of meat, to avoid certain after-tastes characteristic of the starting material used, such as the taste of yeast or the taste of protein hydrolysate, which in most cases tend to supplant or conceal the aroma given off or revealed during the Maillard reaction.

An object of the present invention is to obviate this disadvantage.

The present invention provides a process for the production of a flavouring product reminiscent of meat in taste which comprises diluting a yeast autolysate with at least the same quantity by weight of water, precipitating substantially insoluble salts, especially alkaline-earth metal phosphates, by heating the diluted autolysate at a pH-value of from 7 to 8.5, separating solid fractions from the autolysate treated by heating so that only a solution is left, treating the residual solution by steam distillation concentrating the treated solution by evaporation to a dry matter content of from 75% to 85% by weight, mixing the concentrate obtained with at least one vegetable protein hydrolysate, a monosaccharide and a substance containing sulphur in sulphide form, and heating the mixture for 0.5 to 5 minutes to a temperature of from 100° C. to 200° C. to obtain a reaction product.

The product obtained by the process according to the invention is clearly distinguished from known products by its roasted meat flavour and by the complete absence of any after-taste indicative of the origin of the starting material used for its production.

A standard commercial-grade yeast autolysate, for example an autolysate of baker's yeast or of brewer's yeast, may be used as starting material for carrying out the process according to the invention. In the context of the invention, an autolysate is understood to be a hydrolysate obtained by the action of natural yeast enzymes present in the yeasts and not by the addition of an enzyme or any enzymatic preparation. Autolysates such as these are commercially available under the name of yeast extract in the form of a brown paste with a high dry matter content. This paste may be diluted in water in a ratio of one part by weight of paste to approximately one to four parts, preferably about two parts by weight of water. The pH of the solution may be adjusted to a value of preferably from about 7 to 8 by the addition of sodium hydroxide for example. The solution may be heated to a temperature of from about 92° C. to 98° C. and left at that temperature for about 8 to 15 minutes. After cooling to ambient temperature, the solids which had precipitated may be separated by sedimentation, filtration or centrifuging for example. The residual solution thus obtained may be heated to a temperature of from about 92° C. to 98° C. before being treated by steam distillation. This treatment may be carried out in countercurrent in a column filled with glass elements, such as fragments of tubes, or in a plate column for example. The solution may be introduced at the head of the column, whilst the steam is blown in at the bottom of the column in a ratio of about one part by weight of steam to approximately one to two parts by weight of solution. The solution thus treated may be concentrated in any type of conventional apparatus with one or several effects for example, although it is preferred to use a vacuum evaporator which harms the material being treated as little as possible. After the material being treated has reached a dry matter content of from about 75% to 85% by weight, it may be mixed with the vegetable protein hydrolysate, the monosaccharide and the substance containing sulphur in sulphide form in a ratio of about 60–80:15–30:1–3:1–3% by weight. The vegetable protein hydrolysate may emanate from the treatment with hydrochloric acid of cakes of oilseeds or from the protein residue left after the extraction of starch from cereals for example. The choice of the monosaccharide does not have any particular bearing upon the final result, and it is possible for example to use any pentose or hexose from the D or L series. The same applies to the substance containing sulphur in sulphide form which may be selected as required for example from cystine, cysteine, methionine and other thiamines, either individually or in combination, more especially in hydrochloride form. It is also possible to add to the mixture other standard ingredients, flavours or flavour strengtheners, such as a flavour or an extract of onion or inosine monophosphate or other nucleotide for example. Mixing is preferably carried out under heat, for example at a temperature of from about 40° C. to 50° C. The reaction should take place at a temperature in the range from about 100° C. to 200° C., preferably in the range from 110° to 150° C., over a period of from 30 seconds to 5 minutes, preferably from 1 to 3 minutes. The mixture dries to a certain extent during the reaction and its dry matter content may increase by about 5% for example. This reaction may be carried out in the mixer itself, for example in cases where a kneader equipped with a heating jacket is used, or in a suitable heat exchanger, such as a scraped-surface exchanger for example, or even in a conventional dryer. In the latter case, the reaction may be directly coupled with a possible drying operation to reach a dry matter content well in excess of 80 to 90%, namely of the order of 96 to 99.5%. However, it is preferred to distinguish between reaction and drying, and the reaction of the mixture and its optional drying to a residual moisture content of approximately 0.5 to 4% are preferably carried out separately. After this latter operation, the mass obtained may be ground, for example in a hammer mill, to reduce it into a powder.

The process according to the invention is illustrated by the following Examples, in which the percentages quoted represent percent by weight.

EXAMPLE 1

33% of yeast extract are diluted in 66% of water in a double-jacketed stirrer-equipped boiler. The dry matter content of the solution is adjusted to 26%. The pH-value of the solution is adjusted to pH 7. The temperature of the solution is increased to 95° C. and kept at that level for 10 minutes. The solution is then cooled to ambient temperature and the solids which have precipitated are separated from it by centrifuging. The temperature of the residual solution is then increased to 97° C. The solution thus preheated is passed downwards through a vertical column filled with glass elements in countercurrent to steam ascending through the column at the same throughput by weight. The purified solution obtained is concentrated in a circulation evaporator to a dry matter content of 80%. 1300 g of the paste obtained, 400 g of wheat gluten hydrolysate with a dry matter content of 80% (obtained by acid hydrolysis, followed by filtration, decoloration with active carbon and evaporation). 10 g of natural aroma of fresh onions, 15 g of cysteine hydrochloride, 15 g of thiamine hydrochloride, 100 g of inosine monophosphate and 30 g of glucose are then mixed under heat at 45° C. The mixture obtained is introduced into a kneader formed by a cylindrical body with a double jacket in which rotates a hollow, i.e. heatable, screw to which longitudinal reciprocating movements are imparted. The mixture takes 3 minutes to pass through the kneader in which a temperature of 125° C. is maintained. The reaction product obtained has a pleasant flavour with a distinct note of cooked meat.

EXAMPLE 2

40% of yeast extract and 60% of water are mixed in a double-jacketed boiler. The dry matter content of the solution obtained is adjusted to 32%. The pH-value of the solution is adjusted to pH 7.5 by the addition of sodium hydroxide. The solution is then heated to 95° C. and kept at that temperature for 10 minutes. The solution is then cooled to ambient temperature and the solids which have precipitated are separated from it by filtration. The pH-value of the solution is then adjusted to pH 7.2. The solution is steam distilled in a plate column in countercurrent in a ratio of one part by weight of solution to 0.8 part by weight of steam. The purified solution obtained is concentrated in a circulation evaporator to a dry matter content of 80%. 62.25% of the paste obtained, 25% of powder-form vegetable protein hydrolysate, 0.75% of extract of fresh onions, 0.75% of cysteine hydrochloride, 0.75% of thiamine hydrochloride, 5% of inosine monophosphate and 2.5% of glucose are mixed under heat at 45° C. The mixture is then introduced into a scraped-surface heat exchanger where it remains for 3 minutes at a temperature of from 120° C. to 130° C. The reaction product obtained is dried in vacuo in a drying cabinet where it remains for 7 hours at a temperature of 65° C. The dry mass obtained is then ground in a hammer mill. The product obtained has a pleasant flavour with a distinct note of cooked meat.

EXAMPLE 3

An autolysate paste treated with steam is prepared in the same way as described in Example 1. 65.5% of this paste, 25% of powder-form vegetable protein hydrolysate, 0.5% of extract of fresh onions, 0.75% of cysteine hydrochloride, 0.75% of thiamine hydrochloride, 0.5% of methionine, 5% of inosine monophosphate and 2% of glucose are mixed under heat. The mixture is reacted for 3 minutes at a temperature of from 120° to 130° C. in a scraped-surface heat exchanger. The reaction product obtained has a pleasant flavour with a distinct note of cooked meat.

EXAMPLE 4

A autolysate paste treated with steam is prepared in the same way as described in Example 2. 70% of this paste, 22% of powder-form vegetable protein hydrolysate, 0.5% of extract of fresh onions, 0.8% of cysteine hydrochloride, 0.8% of thiamine hydrochloride 4.3% of inosine monophosphate and 1.6% of glucose are mixed under heat. The mixture is introduced into a scraped-surface heat exchanger where it remains for 3 minutes at a temperature of from 115° to 120° C. The reaction product is dried in vacuo in a drying cabinet where it remains for 8 hours at 65° C. A dry mass is obtained and is ground in a hammer mill. The finely granular product obtained has a pleasant flavour with a distinct note of cooked meat.

We claim:

1. A process for the production of a flavouring product reminiscent of meat in taste, which comprises diluting a yeast autolysate with at least the same quantity by weight of water, precipitating substantially insoluble salts, which includes alkaline-earth metal phosphates, by heating the diluted autolysate at a pH-value in the range from about 7 to 8.5, separating solid fractions from the autolysate treated by heating so that only a solution is left, treating the residual solution obtained by steam distillation, concentrating the treated solution by evaporation to a dry matter content of from 75% to 85% by weight, mixing the concentrate obtained with at least one vegetable protein hydrolysate, a monosaccharide and a substance containing sulphur in sulphide form in a ratio of 60–80:15–30:1–3:1–3% by weight, and heating the mixture for 0.5 to 5 minutes to a temperature in the range from 100° C. to 200° C. to obtain a reaction product.

2. A process as claimed in claim 1, wherein the reaction product is dried to a dry matter content of from 96 to 99.5% by weight, and the dry product obtained is ground.

3. A process as claimed in claim 1, wherein the mixture is heated to a temperature of from 110° to 150° C. over a period of 1 to 3 minutes.

4. A process as claimed in claim 1, wherein the yeast autolysate is diluted with 1.5 to 2 times its weight of water.

5. A process as claimed in claim 1, wherein the diluted autolysate is heated for 8 to 15 minutes to a temperature in the range from 92° to 98° C.

6. A process as claimed in claim 1, wherein the residual solution is treated countercurrently in a ratio of 1 part by weight of steam to 1 to 2 parts by weight of solution.

7. A process as claimed in claim 1, wherein the residual solution is heated to a temperature of from 92° C. to 98° C. before being treated by steam distillation.

* * * * *